3,357,937
PETROLEUM WAX COMPOSITION
Harold E. Pohl, Kankakee, Ill., assignor to General Mills, Inc., a corporation of Delaware
No Drawing. Filed Feb. 18, 1965, Ser. No. 433,791
8 Claims. (Cl. 260—28.5)

This invention relates to a petroleum wax composition and in particular to a petroleum wax composition which is upgraded by incorporation of a polymeric fat acid polyamide.

It has been discovered that incorporation of a polymeric fat acid polyamide into a petroleum wax imparts additional physical and chemical properties to the petroleum wax, such as increased flexibility, adhesion, cohesion, inherent strength, melting point and increased resistance to solvents. However, the polymeric fat acid polyamides are in general incompatible with major amounts of petroleum waxes. It has now been discovered, however, that through the use of ethylene-vinyl acetate copolymers, such polyamides may be made compatible with and incorporated into a petroleum wax providing improved adhesive or coating compositions.

It is therefore an object of this invention to provide a petroleum wax composition having improved properties.

It is also an object of this invention to provide a petroleum wax composition composed of a mixture of a major amount of petroleum wax, a polymeric fat acid polyamide and an ethylene-vinyl acetate copolymer.

It is also an object of this invention to provide a method of rendering a polymeric fat acid polyamide compatible with a major amount of petroleum wax.

The most common petroleum wax is paraffin and this invention is particularly directed to paraffin-wax compositions, preferably those having a melting point in excess of 125° F. up to about 160° F. Briefly, the polymeric fat acid polyamide is blended with an ethylene-vinyl acetate copolymer which is then blended with the petroleum wax by heating the mixture slightly above the melting point to provide a homogeneous melt. Upon cooling, a homogenous improved wax composition is provided.

The polymeric fat acid polyamides suitable for this invention are well known and commercially available. Briefly, these polyamides are the reaction products at conventional amidification conditions of an alkylene diamine or dialkylene triamine with a polymeric fat acid. The amidification is generally carried out by heating at from 100 to 300° C. for from 1 to 8 hours, and conventionally 2 to 4 hours at 200° C. is preferred.

The amines employed may be further defined by the formula

$$H_2N(RNH)_xH$$

where R is an alkylene radical having from 2 to 6 carbon atoms and $x$ is an integer from 1 to 2. Illustrative of the amines are ethylene diamine, 1,3-diaminopropane, 1,2-diaminopropane, 1,4-diaminobutane, 1,6-diaminohexane and diethylene triamine.

The polymeric fat acids are well known and commercially available. One such product is "Versadyme" dimer acids sold by General Mills, Inc.

The term "polymeric fat acids" as used herein is intended to be generic to polymerized acids obtained from "fat acids." The term "fat acids" is intended to include saturated, ethylenically unsaturated and acetylenically unsaturated naturally occurring and synthetic monobasic aliphatic acids containing from 8–24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid and isamic acid.

Because of their ready availability and relative ease of polymerization, oleic and linoleic acid are the preferred starting materials for the preparation of the polymeric fat acids. Mixtures of these acids are found in tall oil fatty acids which are available commercially and accordingly, tall oil fatty acids are generally polymerized commercially to prepare the polymeric fat acids of commerce.

Having obtained the polymeric fat acids or derivatives as described above, they may then be fractionated, for example, by conventional techniques of distillation or solvent extraction. They may be hydrogenated (before or after distillation) to reduce unsaturation under hydrogen pressure in the presence of a hydrogenation catalyst.

Typical compositions of commercially available polymeric fat acids, based on unsaturated $C_{18}$ fat acids from tall oil fatty acids, are:

| | Percent by wt. |
|---|---|
| $C_{18}$ monobasic acids ("monomer") | 5–15 |
| $C_{36}$ dibasic acids ("dimer") | 60–80 |
| $C_{54}$ (and higher) ("trimer") polybasic acids | 10–35 |

The relative ratios of monomer, dimer and trimer (or higher) in unfractionated polymeric fat acids are dependent on the nature of the starting material and the conditions of polymerization. For the purposes of this invention, the term "monomeric fat acids" refers to the unpolymerized monomeric acids or derivatives present in the polymeric fat acids; the term "dimeric fat acids" refers to the dimeric acids or derivatives (formed by the dimerization of two fat acid molecules); and the term "trimeric fat acids" refers to the residual higher polymeric forms consisting primarily of trimeric acids or derivatives, but containing some higher polymeric forms.

For the purposes of this invention, the terms "monomeric," "dimeric" and "trimeric" fat acids, are defined further by a micromolecular distillation analytical method. The method is that of Paschke, R.F., et al., J. Am. Oil Chem. Soc. XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is calculated based on the residue.

In preparing the polyamide, a portion of the polymeric fat acid may be replaced with other dicarboxylic acids or the alkyl esters thereof to prepare copolyamides which are also suitable for use in the present invention. Up to 10 equivalent percent of the polymeric fat acid may be replaced with the other dicarboxylic acid.

The dibasic acids used in conjunction with the dimer acids to prepare the copolyamides of the present invention have the general formula:

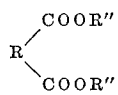

where R is a hydrocarbon radical of from 2 to 20 carbon atoms and R'' is hydrogen or a low aliphatic hydrocarbon radical having from 1 to 8 carbon atoms such as the alkyl groups, methyl, ethyl, propyl, butyl, hexyl and octyl. The preferred range of these dibasic acids is where R is from 2 to 8 carbon atoms, such as adipic, succinic, glutaric, pimelic, suberic, azelaic, sebacic, terephthalic and the like with the acids wherein R is a divalent alkylene radical being the more preferred. From an economic standpoint, adipic and sebacic acids, or mixtures thereof, are preferred at the present time.

Considerable variation is possible in the relative proportions of the reactants employed in preparing the polyamides. In general, it is preferred to employ essentially equivalent amounts of amine and carboxyl groups. However, an excess of amine may be employed. The excess of amine, for example, may be such as to provide an amine number of up to 100. The amine number is an expression of the number of milligrams of potassium hydroxide equivalent to the amine groups in a one-gram sample.

The ethylene-vinyl acetate copolymers employed in this invention are commercially available. Illustrative thereof are the Elvax resins supplied by E. I. du Pont de Nemours & Company, Inc. These resins are described as copolymers of ethylene and vinyl acetate in which the vinyl acetate context is from about 25 to 40% by weight. Illustrative thereof are Elvax 40, Elvax 150, Elvax 240 and Elvax 250.

As indicated, the wax composition is prepared by heating a mixture of the wax, polyamide and ethylene-vinyl acetate copolymer slightly above the melting point thereof to provide a homogeneous melt. Upon cooling, a homogeneous mixture of the ingredients results, proving a wax composition having improved properties.

The ethylene-vinyl acetate copolymer should preferably be employed in an amount of at least 1 part by weight for each 5 parts of paraffin wax to achieve full compatibility. If lesser amounts are employed, only partial compatibility results. If partial compatibility can be tolerated, amounts as low as 0.5 part by weight can be employed. This is particularly true when large amounts of polyamide are to be incorporated in the wax. An increase of the ethylene-vinyl acetate copolymers above the ratio of 4:5 serves no particular purpose except to further plasticize the final product. In general a ratio by weight of 5 parts of the copolymer to 5 parts of wax is not exceeded. The preferred ratio of copolymer to wax is about 3.2 to 5 parts by weight.

The polyamide may be incorporated up to 5 parts by weight to 5 parts by weight of wax. In general, some improvement in properties of the wax composition results from the inclusion of very small amounts of the polyamide. However, it is desirable to employ at least 0.1 part by weight of polyamide to 5 parts of wax, and preferably about 1.5 parts of polyamide to 5 parts of wax.

In general therefore, the wax composition desirably comprises 5 parts by weight of paraffin wax, from 0.5 to 5 parts of ethylene-vinyl acetate copolymer and from 0.1 to 5 parts of polyamide. The preferred composition comprises 5 parts by weight of the wax, 3.2 parts by weight of the copolymer and from 1.5 to 5 parts by weight of polyamide.

The invention is best illustrated by means of the following examples.

*Example I*

The materials set forth below were heated to slightly above the melting point thereof (330° F.) to provide a homogeneous melt which upon cooling provided a wax composition in which the polyamide employed was fully compatible. The wax composition provided showed increased flexibility, adhesion, cohesion, inherent strength and increased resistance to the usual solvents for paraffin wax.

Material: Parts by wt.
Paraffin wax (melting point 135° F.) _____ 30
Polyamide of polymerized tall oil fatty acids and ethylene diamine (amine No. 3) _____ 10
Elvax 150 _____ 19

In the same manner other compositions were provided as follows:

| Material | Parts by Wt. | |
| --- | --- | --- |
|  | Example II | Example III |
| Paraffin Wax | 30 | 30 |
| Polyamide of Polymerized Tall Oil Fatty Acids and Diethylene Triamine (Amine No. about 90) | 10 | 18 |
| Polyamide of Example I | 10 | 12 |
| Elvax 150 | 19 | 19 |

Similar results were obtained substituting Elvax 40, Elvax 240 and Elvax 250 in each of the foregoing formulations.

In addition to the various ingredients making up the improved wax composition, there may be added thereto without affecting the basic properties of the wax composition itself, various ingredients such as fillers, pigments, dyes and the like to provide additional desirable properties conventionally found in wax compositions for their respective desirable properties.

The embodiments of the invention in which an exclusive property or privilege is claimed are defined as follows:

1. An improved wax composition consisting essentially of 5 parts by weight of a petroleum wax, from 0.5 to 5 parts by weight of a copolymer of ethylene and vinyl acetate and from 0.1 to 5 parts by weight of a polymeric fat acid polyamide.

2. An improved wax composition as defined in claim 1 in which said petroleum wax is paraffin having a melting point not less than 125° F.

3. An improved wax composition as defined in claim 1 in which said polyamide is the amidification product of polymerized fatty acids and an amine of the formula $$H_2N(RNH)_xH$$

where R is an alkylene radical having from 2 to 6 carbon atoms and x is an integer selected from the group consisting of 1 and 2.

4. An improved wax composition consisting essentially of 5 parts by weight of a paraffin wax having a melting point of from 125–160° F., 0.5 to 5 parts by weight of a copolymer of ethylene and vinyl acetate and 0.1 to 5 parts by weight of a polymeric fat acid polyamide.

5. An improved wax composition consisting essentially of 5 parts by weight of a paraffin wax having a melting point of from 125–160° F., 1 to 5 parts by weight of a copolymer of ethylene and vinyl acetate and 1.5 to 5 parts by weight of a polymeric fat acid polyamide.

6. An improved wax composition consisting essentially of 30 parts by weight of a paraffin wax having a melting point of from 125–160° F., 19 parts by weight of a copolymer of ethylene and vinyl acetate in which from 25–40% by weight of said copolymer is vinyl acetate and 10 parts by weight of a polyamide of diethylene triamine and polymerized tall oil fatty acids.

7. An improved wax composition consisting essentially of 30 parts by weight of a paraffin wax having a melting point of from 125–160° F., 19 parts by weight of a copolymer of ethylene and vinyl acetate in which from 25–40% by weight of said copolymer is vinyl acetate and 10 parts by weight of a polyamide of ethylene diamine and polymerized tall oil fatty acids.

8. An improved wax composition consisting essentially of 30 parts by weight of a paraffin wax having a melting point of from 125–160° F., 19 parts by weight of a copolymer of ethylene and vinyl acetate in which from 25–40% by weight of said copolymer is vinyl acetate, 18 parts by weight of a polyamide of polymerized tall oil fatty acids and diethylene triamine and 12 parts by weight of a polyamide of ethylene diamine and polymerized tall oil fatty acids.

References Cited
UNITED STATES PATENTS

| | | | |
|---|---|---|---|
| 2,965,591 | 12/1960 | Dazzi | 260—32.6 |
| 3,260,692 | 7/1966 | Magne et al. | 260—32.6 |
| 3,275,494 | 8/1966 | Bruson et al. | 260—28.5 |

MORRIS LIEBMAN, *Primary Examiner.*